(12) United States Patent
Park et al.

(10) Patent No.: US 9,100,649 B2
(45) Date of Patent: Aug. 4, 2015

(54) METHOD AND APPARATUS FOR PROCESSING A VIDEO SIGNAL

(75) Inventors: Seungwook Park, Seoul (KR); Joonyoung Park, Seoul (KR); Jungsun Kim, Seoul (KR); Younghee Choi, Seoul (KR); Yongjoon Jeon, Seoul (KR); Jaewon Sung, Seoul (KR); Byeongmoon Jeon, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 13/578,000

(22) PCT Filed: Feb. 10, 2011

(86) PCT No.: PCT/KR2011/000898
§ 371 (c)(1),
(2), (4) Date: Aug. 9, 2012

(87) PCT Pub. No.: WO2011/099792
PCT Pub. Date: Aug. 18, 2011

(65) Prior Publication Data
US 2013/0051469 A1 Feb. 28, 2013

Related U.S. Application Data

(60) Provisional application No. 61/303,272, filed on Feb. 10, 2010, provisional application No. 61/346,014, filed on May 18, 2010, provisional application No. 61/348,259, filed on May 26, 2010, provisional application No. 61/349,196, filed on May 27, 2010.

(51) Int. Cl.
*H04N 7/32* (2006.01)
*H04N 19/157* (2014.01)
(Continued)

(52) U.S. Cl.
CPC ............ *H04N 19/157* (2014.11); *H04N 19/11* (2014.11); *H04N 19/119* (2014.11);
(Continued)

(58) Field of Classification Search
None
See application file for complete search history.

(56) References Cited

U.S. PATENT DOCUMENTS

| 5,260,782 A | 11/1993 | Hui |
| 2006/0120455 A1 | 6/2006 | Park et al. |
| 2006/0251330 A1 | 11/2006 | Toth et al. |

FOREIGN PATENT DOCUMENTS

| EP | 0531041 A1 | 3/1993 |
| KR | 10-1993-0005468 A | 3/1993 |

(Continued)

OTHER PUBLICATIONS

Sang Heon Lee et al. "Intra prediction method based on the linear relationship between the channels for YUV 4:2:0 intra coding," Image Processing (ICIP) 2009 16th IEEE International Conference On, IEEE, Nov. 7, 2009, pp. 1037-1040, XP031628426.*

(Continued)

*Primary Examiner* — Andy Rao
*Assistant Examiner* — Tyler Edwards
(74) *Attorney, Agent, or Firm* — Fish & Richardson P.C.

(57) ABSTRACT

The present invention relates to a method and apparatus for encoding or decoding a video signal. The method for processing a video signal according to the present invention determines the type of a block in accordance with the information which indicates whether to partition or merge the current block, acquires predicted values of each sub-block using restored peripheral pixels for each sub-block, and restores the current block using the acquired values. Here, pixels used for acquiring predicted values may include restored pixels for other sub-blocks contained in the current block, and the type of sub-blocks can be taken into account in a prediction mode for acquiring predicted values.

10 Claims, 16 Drawing Sheets

| prediction mode number | prediction mode |
|---|---|
| 0 | Vertical |
| 1 | Horizontal |
| 2 | DC |
| 3 | Diagonal_Down_Left |
| 4 | Diagonal_Down_Right |
| 5 | Vertical_Right |
| 6 | Horizontal_Down |
| 7 | Vertical_Left |
| 8 | Horizontal_Up |

(51) Int. Cl.
| | |
|---|---|
| H04N 19/159 | (2014.01) |
| H04N 19/176 | (2014.01) |
| H04N 19/70 | (2014.01) |
| H04N 19/119 | (2014.01) |
| H04N 19/11 | (2014.01) |
| H04N 19/463 | (2014.01) |
| H04N 19/136 | (2014.01) |
| H04N 19/186 | (2014.01) |
| H04N 19/61 | (2014.01) |
| H04N 19/593 | (2014.01) |

(52) U.S. Cl.
CPC .......... *H04N 19/136* (2014.11); *H04N 19/159* (2014.11); *H04N 19/176* (2014.11); *H04N 19/186* (2014.11); *H04N 19/463* (2014.11); *H04N 19/70* (2014.11); *H04N 19/593* (2014.11); *H04N 19/61* (2014.11)

(56) References Cited

FOREIGN PATENT DOCUMENTS

| KR | 10-2006-0027795 A | 3/2006 |
|---|---|---|
| KR | 10-2006-0064509 A | 6/2006 |
| WO | WO 2004/104930 A3 | 12/2004 |

OTHER PUBLICATIONS

Sang Heon Lee et al. "A new intra-prediction method using channel correlations for the H.264/AVC intra coding," Picture Coding Symposium, 2009. PCS 2009, IEEE, May 6, 2009, pp. 1-4, XP031491624, ISBN: 978-1-4244-4593-6.*

Sang Heon Lee et al., "Intra prediction method based on the linear relationship between the channels for YUV 4:2:0 intra coding," Image Processing (ICIP) 2009, 16th IEEE International Conference On, IEEE, Nov. 7, 2009.*

European Partial Search Report dated Feb. 13, 2014 for Application No. 11742484, 7 pages.

Sang Heon Lee et al: "Intra prediction method based on the linear relationship between the channels for YUV 4:2:0 intra coding", Image Processing (ICIP), 2009 16th IEEE International Coneerence On, IEEE, Piscataway, NJ, USA, Nov. 7, 2009, pp. 1037-1040, XP031628426, DOI: 10.1109/ICIP.2009.5413727 ISBN: 978-1-4244-5653-6 *the whole document*.

Sang Heon Lee et al: "A new intra prediction method using channel correlations for the H.264/AVC intra coding", Picture Coding Symposium, 2009. PCS 2009, IEEE, Pisactawaym NJ, USA, May 6, 2009, pp. 1-4, XP031491624, ISBN: 978-1-4244-4593-6 *the whole document*.

Kim S Y et al: "Video compression using inter color prediction scheme", Visual Communications and Image Processing; Dec. 7, 2005-Jul. 15, 2005; Bejing, Jul. 12, 2005, XP030081071, *the whole document*.

Yong-Hwan Kim et al: "High-Fidelity RGB Video Coding Using Adaptive Inter-Plane Weighted Prediction", IEEE Transactions on Circuits and Systems for Video Technology, IEEE Service Center, Piscataway, NJ, US, vol. 19, No. 7, Jul. 1, 2009, pp. 1051-1056, XP011254899, ISSN:1051-8215 *the whole document*.

Jeon (LG) B et al: "Video coding technology proposal by LG Electronics", 1. JCT-VC Meeting; Apr. 15, 2010-Apr. 23, 2010; Dresden; (JointCollaborative Team on Video Coding of ISO/IEC JTC1/SC29/WG11 and ITU-TSG.16); URL:http://wftp3.itu.int/av-arch/jctvc-site/, No. XP030007544, Apr. 13, 2010, XP030007545, ISSN: 0000-0049 *the whole document*.

Ken McCann et al: "Samsung's Response to the Call for Proposals on Video Compression Technology", Joint Collaborative Team on Video Coding (JCT-VC) of ITU-T SG13 WP3 and ISO/IEC JTC1/SC29/WG11, 1st Meeting: Dresden, DE, Apr. 15-23, 2010, vol. JCTVC-A124 Apr. 15, 2010, pp. 1-40, XP002649004, Retrieved from the Internet: URL:http://wftp3.itu.int/av-arch/jctvc-site/ [retrieved on Apr. 15, 2010] *the whole document*.

PCT International Search Report dated Oct. 6, 2011 for Application No. PCT/KR2011/000898, with English Translation, 4 pages.

* cited by examiner

| prediction mode number | prediction mode |
|---|---|
| 0 | Vertical |
| 1 | Horizontal |
| 2 | DC |
| 3 | Diagonal_Down_Left |
| 4 | Diagonal_Down_Right |
| 5 | Vertical_Right |
| 6 | Horizontal_Down |
| 7 | Vertical_Left |
| 8 | Horizontal_Up |

FIG. 8

| prediction mode number | existing method | proposed method 1 | proposed method 2 | proposed method 3 |
|---|---|---|---|---|
| 0 | Hori | Hori_down | Vert_right | Hori_down |
| 1 | DC | Hori | Vert_left | Vert_right |
| 2 | Diag_down_left | DC | Hori | Vert_left |
| 3 | Diag_down_right | Diag_down_left | DC | Hori |
| 4 | Vert_right | Diag_down_right | Diag_down_left | Diag_down_right |
| 5 | Hori_down | Vert_right | Diag_down_right | DC |
| 6 | Vert_left | Vert_left | Hori_down | Diag_down_left |
| 7 | Hori_up | Hori_up | Hori_up | Hori_up |

FIG. 10
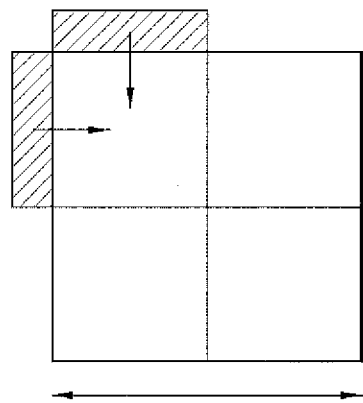
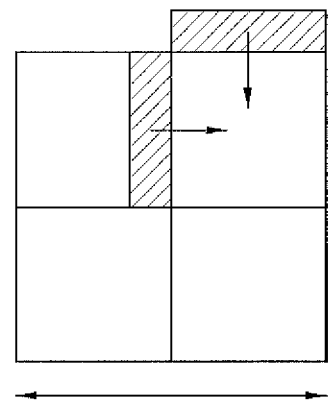
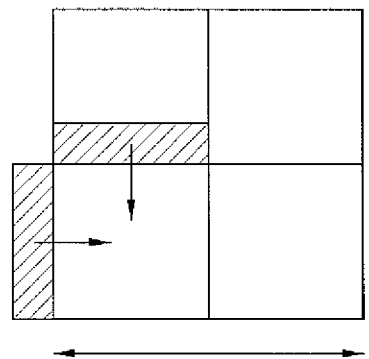
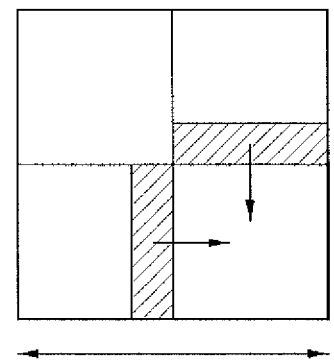

FIG. 11

```
mb_pred( mb_type) {
    if( MbPartPredMode( mb_type, 0 ) = = Intra_4x4  ||
        MbPartPredMode( mb_type, 0 ) = = Intra_8x8  ||
        MbPartPredMode( mb_type, 0 ) = = Intra_16x16 {
        if( MbPartPredMode( mb_type, 0 ) = = Intra_4x4
            for( luma4x4BlkIdx=0; luma4x4BlkIdx<16; luma4x4BlkIdx++ ) {
                prev_intra4x4_preb_mode_flag[ luma4x4BlkIdx ]
                if( !prev_intra4x4_pred_mode_flag)[ luma4x4BlkIdx ]
                    rem_intra4x4_preb_mode_[ luma4x4BlkIdx ]
            }
        if( MbPartPredMode( mb_type, 0 ) = = Intra_8x8
            for( luma8x8BlkIdx=0; luma8x8BlkIdx<16; luma8x8BlkIdx++ ) {
                prev_intra8x8_preb_mode_flag[ luma8x8BlkIdx ]
                if( !prev_intra8x8_pred_mode_flag)[ luma8x8BlkIdx ]
                    rem_intra8x8_preb_mode_[ luma8x8BlkIdx ]
            }
        if( chroma_format_idc != 0 ) {
            chroma_estimation_flag
            if(!chroma_estimation_flag)
                intra_chroma_pred_mode
        }
    }
}
```

FIG. 15

```
mb_pred( mb_type ) {
    ......;
    } else if( MbPartPredMode( mb_type, 0 ) != Direct ) {
        for( mbPartIdx = 0; mbPartIdx < NumMbPart( mb_type ); mbPartIdx++)

if( ( num_ref_idx_l0_active_minus1 > 0 ||
                    mb_field_decoding_flag ) &&
                MbPartPredMode( mb_type, mbPartIdx ) != Pred_L1 )
                ref_idx_l0[ mbPartIdx ]
        for( mbPartIdx = 0; mbPartIdx < NumMbPart( mb_type ); mbPartIdx++)

if( ( num_ref_idx_l1_active_minus1 > 0 ||
                    mb_field_decoding_flag ) &&
                MbPartPredMode( mb_type, mbPartIdx ) != Pred_L0 )
                ref_idx_l1[ mbPartIdx ]
        for( mbPartIdx = 0; mbPartIdx < NumMbPart( mb_type ); mbPartIdx++)

if( MbPartPredMode ( mb_type, mbPartIdx ) != Pred_L1 )
                for( compIdx = 0; compIdx < 2; compIdx++ )
                    mvd_l0[ mbPartIdx ][ 0 ][ compIdx ]
        for( mbPartIdx = 0; mbPartIdx < NumMbPart( mb_type ); mbPartIdx++)

if( MbPartPredMode( mb_type, mbPartIdx ) != Pred_L0 )
                for( compIdx = 0; compIdx < 2; compIdx++ )
                    mvd_l1[ mbPartIdx ][ 0 ][ compIdx ]
            chroma_estimation_flag
    }
}
```

FIG. 16

```
mb_pred( mb_type ) {
    ……;
    } else if( MbPartPredMode( mb_type, 0 ) != Direct ) {
        for( mbPartIdx = 0; mbPartIdx < NumMbPart( mb_type ); mbPartIdx++)

if( ( num_ref_idx_l0_active_minus1 > 0 ||
                mb_field_decoding_flag ) &&
                MbPartPredMode( mb_type, mbPartIdx ) != Pred_L1 )
                    ref_idx_l0[ mbPartIdx ]
        for( mbPartIdx = 0; mbPartIdx < NumMbPart( mb_type ); mbPartIdx++)

if( ( num_ref_idx_l1_active_minus1 > 0 ||
                mb_field_decoding_flag ) &&
                MbPartPredMode( mb_type, mbPartIdx ) != Pred_L0 )
                    ref_idx_l1[ mbPartIdx ]
        for( mbPartIdx = 0; mbPartIdx < NumMbPart( mb_type ); mbPartIdx++)

if( MbPartPredMode ( mb_type, mbPartIdx ) != Pred_L1 )
                for( compIdx = 0; compIdx < 2; compIdx++ )
                    mvd_l0[ mbPartIdx ][ 0 ][ compIdx ]
        for( mbPartIdx = 0; mbPartIdx < NumMbPart( mb_type ); mbPartIdx++)

if( MbPartPredMode( mb_type, mbPartIdx ) != Pred_L0 )
                for( compIdx = 0; compIdx < 2; compIdx++ )
                    mvd_l1[ mbPartIdx ][ 0 ][ compIdx ]
            chroma_estimation_flag
            chroma_hybrid_prediction_flag
    }
}
```

METHOD AND APPARATUS FOR PROCESSING A VIDEO SIGNAL

CROSS REFERENCE TO RELATED APPLICATIONS

This application is a U.S. National Phase Application under 35 U.S.C. §371 of International Application PCT/KR2011/000898, filed on Feb. 10, 2011, which claims the benefit of U.S. Provisional Application No. 61/303,272, filed on Feb. 10, 2010, Provisional Application No. 61/346,014, filed May 18, 2010, Provisional Application No. 61/348,259, filed May 26, 2010 and Provisional Application No. 61/349,196, filed May 27, 2010, the entire contents of which are hereby incorporated by reference in their entireties.

TECHNICAL FIELD

The present invention relates to a method and apparatus for processing a video signal, and more particularly, to a method and apparatus for efficiently encoding or decoding a video signal.

BACKGROUND ART

Compression encoding refers to a series of signal processing techniques of transmitting digitized information via a communication line or storing digitized information in a form suitable for a storage medium. In general, video, audio and text are subjected to compression encoding. In particular, a technique of performing compression encoding with respect to video is referred to as video compression. Compression encoding of video is achieved by eliminating redundant information in consideration of spatial correlation, temporal correlation, probabilistic correlation, etc. However, recently, with development of a variety of media and data transfer media, there is a need for a method and apparatus for efficiently processing a video signal.

DISCLOSURE

Technical Problem

The present invention is contrived to solve the above demand and an object of the present invention is to provide a video signal processing method capable of efficiently compressing a video signal using various motion prediction methods.

Another object of the present invention is to provide an efficient and accurate method even in the case of using prediction blocks having various shapes in intra prediction.

Another object of the present invention is to improve a compression rate by efficiently allocating a number indicating a prediction mode.

Another object of the present invention is to provide a more accurate and efficient prediction method in intra prediction of a chrominance component.

Another object of the present invention is to efficiently process a video signal by more accurately predicting a motion vector of a current block in inter prediction.

Technical Solution

The object of the present invention can be achieved by providing various prediction block shapes using information such as a partition flag or a merge flag in intra prediction.

There is provided a prediction method which can be appropriately used even in case of using prediction blocks having various sizes and shapes in prediction of a most prediction mode of a current block using prediction modes of neighboring blocks in intra prediction.

There is provided a method of adaptively allocating a number indicating a prediction mode according to prediction block.

There is provided a method of predicting and independently restoring a partitioned sub-prediction block in intra prediction of a chrominance component using neighboring pixels thereof.

There is provided a new intra prediction mode using a luminance component in prediction of a chrominance component and syntax using the same.

There is provided a method of deriving a motion vector of a neighboring intra block in order to more accurately predict a motion vector of a current vector in inter prediction.

Advantageous Effects

According to the embodiments of the present invention, it is possible to efficiently encode and decode a video signal. More specifically, it is possible to efficiently predict a most prediction mode in intra prediction. In particular, it is possible to use prediction blocks having various sizes and shapes and to derive prediction modes suitable for various prediction blocks. In addition, it is possible to efficiently represent a prediction mode using a small amount of information by adaptively allocating a number to a prediction mode. In addition, it is possible to independently restore a partitioned sub-prediction block in prediction of a chrominance component and to more accurately perform prediction by using neighboring pixels of each sub-prediction block. In addition, it is possible to reduce the amount of information transmitted using a luminance component in prediction of a chrominance component.

In inter prediction, it is possible to acquire a more accurate motion vector prediction value by predicting a motion vector with respect to an intra block without motion information. In addition, it is possible to use a hybrid method of using a luminance component and motion compensation in prediction of a chrominance component.

DESCRIPTION OF DRAWINGS

FIGS. 7 to 8 are diagrams illustrating prediction mode number allocation according to embodiments of the present invention;

FIG. 10 is a diagram showing an area used by each sub-prediction block for intra prediction if one prediction block is quartered according to an embodiment of the present invention;

FIG. 11 is a diagram showing an example of the syntax including flag information indicating whether a new intra prediction mode is used;

FIG. 15 is a diagram showing an example of the syntax including flag information indicating whether a new intra prediction mode is used; and FIG. 16 is a diagram showing an example of the syntax indicating whether a hybrid mode among inter prediction modes is used.

BEST MODE

Figure 1:
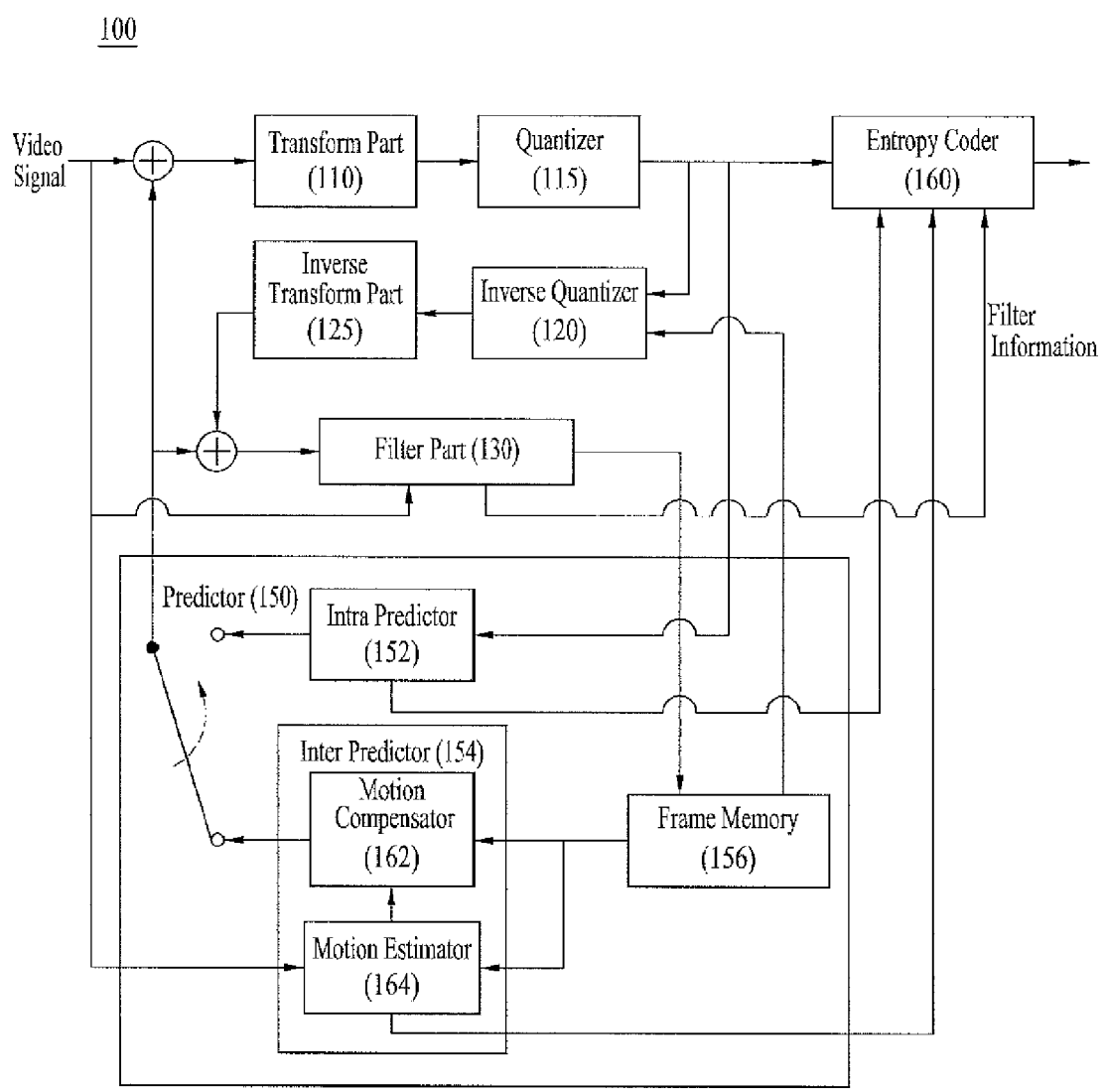
FIG. 1 is a schematic block diagram of a video signal encoding apparatus according to an embodiment of the present invention.

The object of the present invention can be achieved by providing a method of processing a video signal including acquiring partition information indicating whether a current block is partitioned, partitioning the current block into square sub-blocks if the partition information indicates that the current block is partitioned, acquiring prediction values of the sub-blocks using restored pixels in a current picture, and restoring the current block using the prediction values. The restored pixels in the current picture used to acquire the prediction values include restored pixels of other sub-blocks included in the current block.

The method may further include acquiring merge flag information indicating whether the sub-blocks of the current block are merged, and, if the merge flag information indicates that the sub-blocks of the current block are merged, the prediction values may be acquired with respect to a shape of the merged block. At this time, sub-blocks which are vertically or horizontally adjacent may be merged and the merged sub-block may have a rectangular shape.

The method may further include predicting a prediction mode of the current block using a prediction mode of an upper neighboring block or a left neighboring block of the current block, the acquiring the prediction values may use reference pixels located in a direction indicated by the prediction mode, and a partition of the sub-blocks may be taken into consideration in the prediction of the prediction mode.

In the video signal processing method according to the present invention, a prediction number can be more efficiently allocated to the prediction mode of the current block by considering a occurrence frequency. For example, one prediction mode having a smaller value between an upper neighboring block and a left neighboring block may be selected and a low prediction number may be allocated to the other value or to adjacent prediction modes of the selected prediction mode.

MODE FOR INVENTION

Hereinafter, the exemplary embodiments of the present invention will be described in detail with reference to the accompanying drawings. The terms used in the present specification and claims are not limited to general meanings thereof and are construed as meanings and concepts suiting the technical spirit of the present invention based on the rule of appropriately defining the concepts of the terms in order to illustrate the invention in the best way possible. The embodiments described in the present specification and the configurations shown in the drawings are merely exemplary and various modifications and equivalents thereof may be made.

In the present invention, the following terms may be construed based on the following criteria, and terms which are not used herein may also be construed based on the following criteria. The term coding may be construed as encoding or decoding and the term information includes values, parameters, coefficients, elements, etc. and the meanings thereof may be differently construed according to circumstances and the present invention is not limited thereto. The term "unit" indicates a basic video processing unit or a specific position of video and may be used interchangeably with the term "block" or "area" as necessary.

FIG. 1 is a schematic block diagram of a video signal encoding apparatus 100 according to an embodiment of the present invention. Referring to FIG. 1, the encoding apparatus 100 of the present invention includes a transform part 110, a quantizer 115, an inverse quantizer 120, an inverse transform part 125, a filter part 130, a predictor 150 and an entropy coder 160.

The transform part 110 transforms a pixel value of a received video signal and acquires a transform coefficient value. As a transform method, for example, Discrete Cosine Transform (DCT), Wavelet Transform, etc. may be used. In particular, DCT is performed by partitioning the received video signal into blocks each having a predetermined size.

The quantizer 115 quantizes the transform coefficient value output from the transform part 110. The inverse quantizer 120 inversely quantizes the transform coefficient value and the inverse transform part 125 restores a pixel value using the inversely quantized transform coefficient value.

The filter part 130 performs a filtering operation for improving quality of the restored image. The filter part may include a deblocking filter and/or an adaptive loop filter, for example. The filtered image is output or stored in a frame memory 156 so as to be used as a reference image.

In order to increase coding efficiency, a method of predicting an image using a previously coded area and adding a residual value between an image and a predicted image to the predicted image so as to acquire a restored image is used. An intra predictor 152 performs prediction within a current image and an inter predictor 154 predicts a current image using at least one reference image stored in the frame memory 156. The intra predictor 152 performs intra prediction from restored areas of the current image and sends the intra coding information to the entropy coder 160. The inter predictor 154 may be configured to include a motion compensator 162 and a motion estimator 164. The motion estimator 164 acquires a motion vector value of a current area by referring to a specific restored area. The motion estimator 164 may send position information (a reference frame, a motion vector, etc.) of a reference area to the entropy coder 160 to be included in a bitstream. The motion compensator 162 performs inter motion compensation using the motion vector value received from the motion estimator 164.

The entropy coder 160 entropy-codes the quantized transform coefficient, inter coding information, intra coding information and the reference area information received from the inter predictor 154 to generate a video signal bitstream. The entropy coder 160 may use a variable length coding (VLC) scheme, an arithmetic coding scheme, etc. The VLC scheme transforms input symbols into continuous codewords and the length of the codeword is variable. For example, frequently occurred symbols may be expressed by a short codeword and symbols which are not frequently occurred may be expressed by a long codeword. As the VLC scheme, a Context-based Adaptive Variable Length Coding (CAVLC) scheme may be used. The arithmetic coding scheme transforms continuous data symbols into one prime number. It is possible to obtain an optimal prime number bit necessary to express each symbol using arithmetic coding. As arithmetic coding, a Context-based Adaptive Binary Arithmetic Code (CABAC) may be used.

Figure 2:
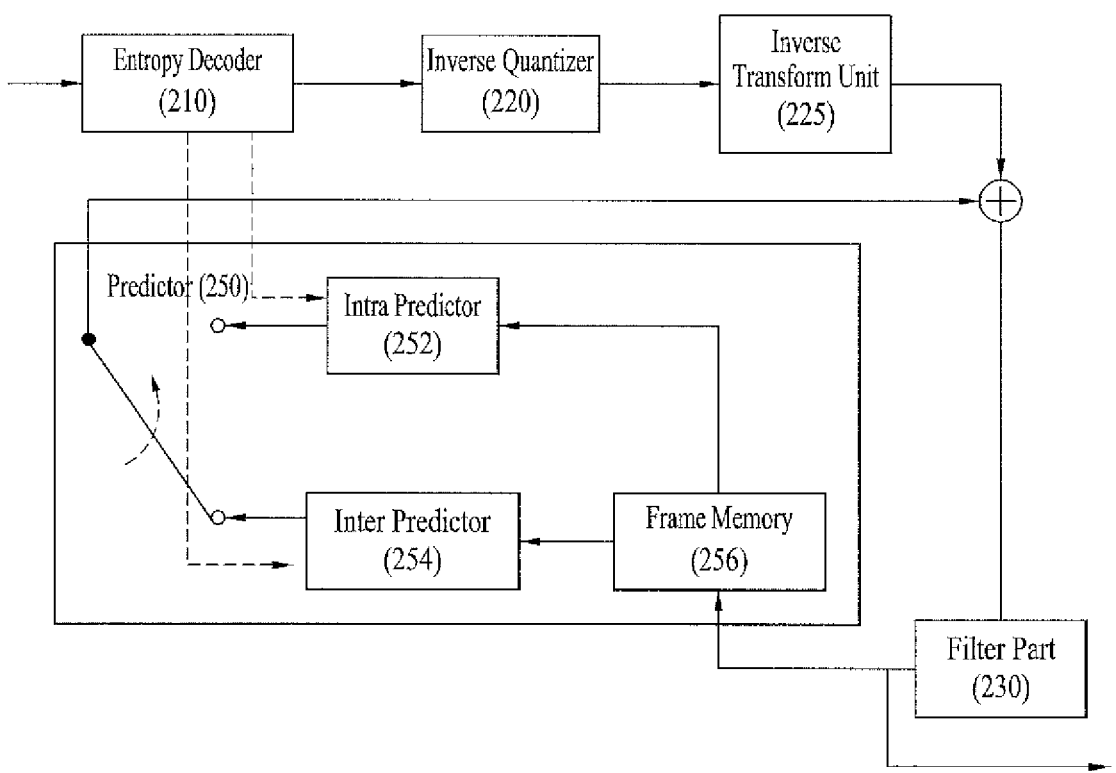
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoder 210, an inverse quantizer 220, an inverse transform part 225, a filter unit 230 and a predictor 250.

The entropy decoder 210 entropy-decodes a video signal stream and extracts an coding type, a transform coefficient of each area, a motion vector, etc. The inverse quantizer 220 inversely quantizes the entropy-decoded transform efficient and the inverse transform part 225 restores an pixel value using the inversely quantized transform coefficient.

The predictor 250 includes an intra predictor 252 and an inter predictor 254 and restores a prediction image using an coding type, a transform coefficient of each area and a motion vector decoded through the entropy decoder 210.

The intra predictor 252 generates an intra prediction image from decoded samples of a current image. In addition, the inter predictor 254 generates a prediction image using the reference image stored in the frame memory 256. The pixel value output from the inverse transform part 225 is added to the prediction image output from the intra predictor 252 or the inter predictor 254 to generate a restored video frame.

The filter part 230 filters the restored video frame to improve image quality. A deblocking filter for reducing a block distortion phenomenon and an adaptive loop filter for eliminating distortion of an entire image may be included. The filtered image is output as a final image and is stored in the frame memory 256 in order to be used as the reference image.

A coding unit is a basic unit for processing an image in a video signal processing procedure, e.g., intra/inter prediction, transform, quantization and/or entropy coding. The size of the coding unit used to code one image may not be constant. The coding unit may have a rectangular shape and one coding unit may be partitioned into several coding units. For example, one coding unit having a size of 2N×2N may be partitioned into four coding units having a size of N×N. The coding unit may be recursively partitioned and need not be partitioned into coding units having the same shape. For convenience of the coding and processing procedure, there is a limit to a maximum size or a minimum size of the coding unit.

With respect to one coding unit, information indicating whether the coding unit is partitioned may be specified. For example, if a flag value indicating partition/non-partition is 1, a block corresponding to the node is partitioned into four blocks and, if the flag value is 0, the coding unit may be processed without partition.

The structure of the coding unit may be expressed using a recursive tree structure. That is, the coding unit partitioned has child nodes corresponding in number to the number of partitioned coding units using one image or a maximum-size coding unit as a root. Accordingly, a coding unit which is no longer partitioned becomes a leaf node. If it is assumed that one coding unit is only partitioned into squares, one coding unit may be partitioned into four coding units and thus a tree representing a coding unit structure becomes a quad tree.

An encoder may select an optimal size of the coding unit by taking the properties (e.g., resolution) of the video signal or coding efficiency into consideration, and information about the size of the coding unit or information for driving the size of the coding unit may be included in a bitstream. For example, the maximum size of the coding unit and the maximum depth of the tree may be defined. If the coding unit is partitioned into squares, the height and width of the coding unit is half of the height and width of the coding unit of a parent node. Accordingly, it is possible to obtain a minimum coding unit size using the above information. Inversely, a minimum size of the coding unit and a maximum depth of the tree are defined and the maximum size of the coding unit may be derived using the minimum size of the coding unit and the maximum depth of the tree. In partitioning into squares, since the size of the unit is changed in the form of a multiple of 2, the actual size of the coding unit is expressed by a log value based on 2 so as to improve transmission efficiency.

A decoder may acquire information indicating whether a current unit is partitioned. If such information is acquired (transmitted) only under a specific condition, efficiency can be increased. For example, since the current unit can be partitioned when addition of a current coding unit size and information about a current position is less than the size of the image and the current coding unit size is greater than a predetermined minimum coding unit size, it is possible to acquire information indicating whether the coding unit is partitioned only in this case.

If the information indicates that the coding unit is partitioned, the size of the partitioned coding unit becomes half of the current coding unit and the current coding unit is partitioned into four square coding units based on the current processing position. The partitioned coding units are repeatedly subjected to the above processes.

Image prediction (motion compensation) for coding is performed with respect to a coding unit (that is, a leaf node of a coding unit tree) which is no longer partitioned. A basic unit for performing such prediction is referred to a prediction unit or a prediction block. The prediction block may be partitioned to have various shapes and each partitioned part is referred to as a sub-prediction unit or sub-prediction block. One prediction block may be partitioned into sub-prediction blocks having a symmetrical shape such as a square or a rectangle, an asymmetrical shape or a geometric shape. The bitstream may include information indicating whether a prediction block is partitioned or information about the shape of a sub-prediction block. Alternatively, such information may be derived from other information.

In prediction, various modes such as an intra prediction mode MODE_INTRA, a direct prediction mode MODE_DIRECT, an inter prediction mode MODE_INTER and a skip mode MODE_SKIP may be used. Prediction mode information indicates which mode is used. In a special case, it is possible to reduce the amount of transmitted information by deriving prediction mode information instead of transmitting prediction mode information.

Figure 3:
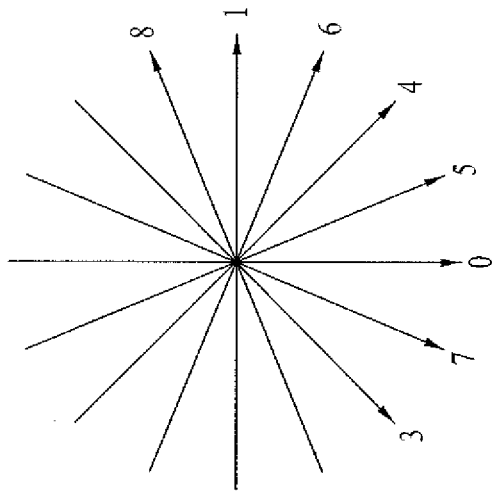
FIG. 3 is a diagram showing nine prediction modes and directions thereof in an intra 4×4 mode of H.264/AVC.

The intra predictor 252 performs intra prediction for predicting a pixel value of a target unit from restored areas of the current image. For example, the pixel value of the current unit may be predicted from pixels of units located on the upper, left, left-upper and/or right-upper side of the current unit. At this time, a method of using reference pixels located in various directions such as a vertical direction, a horizontal direction and a diagonal direction or using an average value of restored pixels may be used in predicting a pixel value. With respect to various prediction methods, several modes are defined and used. FIG. 3 shows nine prediction modes and directions thereof in an intra 4×4 mode of H.264/AVC. In particular, among others, prediction mode calculating an average value by referring only to pixels which do not deviate from a picture boundary is referred to "DC" prediction (prediction mode 2).

The encoder transmits information as to which mode is used in intra prediction and the decoder acquires a prediction value of a current prediction block according to the mode information. In transmitting such information, if a smaller number is allocated as a prediction direction generation frequency is higher, the amount of transmitted information is reduced and thus compression efficiency can be increased. Referring to 3, numbers 0 to 8 may be allocated to the nine prediction modes in the order of frequency.

Figure 4:
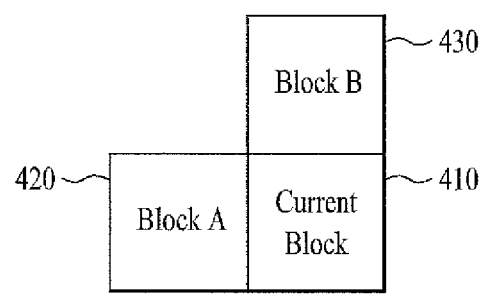
FIG. 4 is a diagram showing neighboring blocks used to derive a most probable mode as a prediction mode of a current block according to an embodiment of the present invention.

Since a prediction mode used by a current prediction block correlates with prediction modes of neighboring blocks, a most probable mode which can be used as the prediction mode of the current block may be derived (predicted) from prediction modes of neighboring blocks. Hereinafter, for convenience, the above predicted mode is referred to as "MPM of a current block". FIG. 4 shows neighboring blocks used to predict MPM of a current block according to an embodiment of the present invention. Referring to FIG. 4, since coding is performed from the upper side to the lower side and the left to the right of one image, a left neighboring block 420 and an upper neighboring block 430 of a current block 410 are already coded. For example, the prediction mode of the left neighboring block and the prediction mode of the upper neighboring block may be compared and the prediction mode having the smaller number may be used as the MPM of the current block.

If neighboring blocks are not available or are not coded in an intra prediction mode, the prediction mode information of such neighboring blocks may not be used to derive the intra prediction mode of the current block. Accordingly, information about the states of the neighboring blocks may be used to derive the prediction mode of the current block.

For example, if one or more of the left neighboring block or the upper neighboring block of the current block is not available, is coded in an inter prediction mode or is not coded in a specific intra prediction mode, a DC prediction mode may be set as the MPM of the current block. In other cases, as described above, the prediction mode to which the smaller number is allocated may be selected from the prediction modes of the two neighboring blocks.

Figure 5:
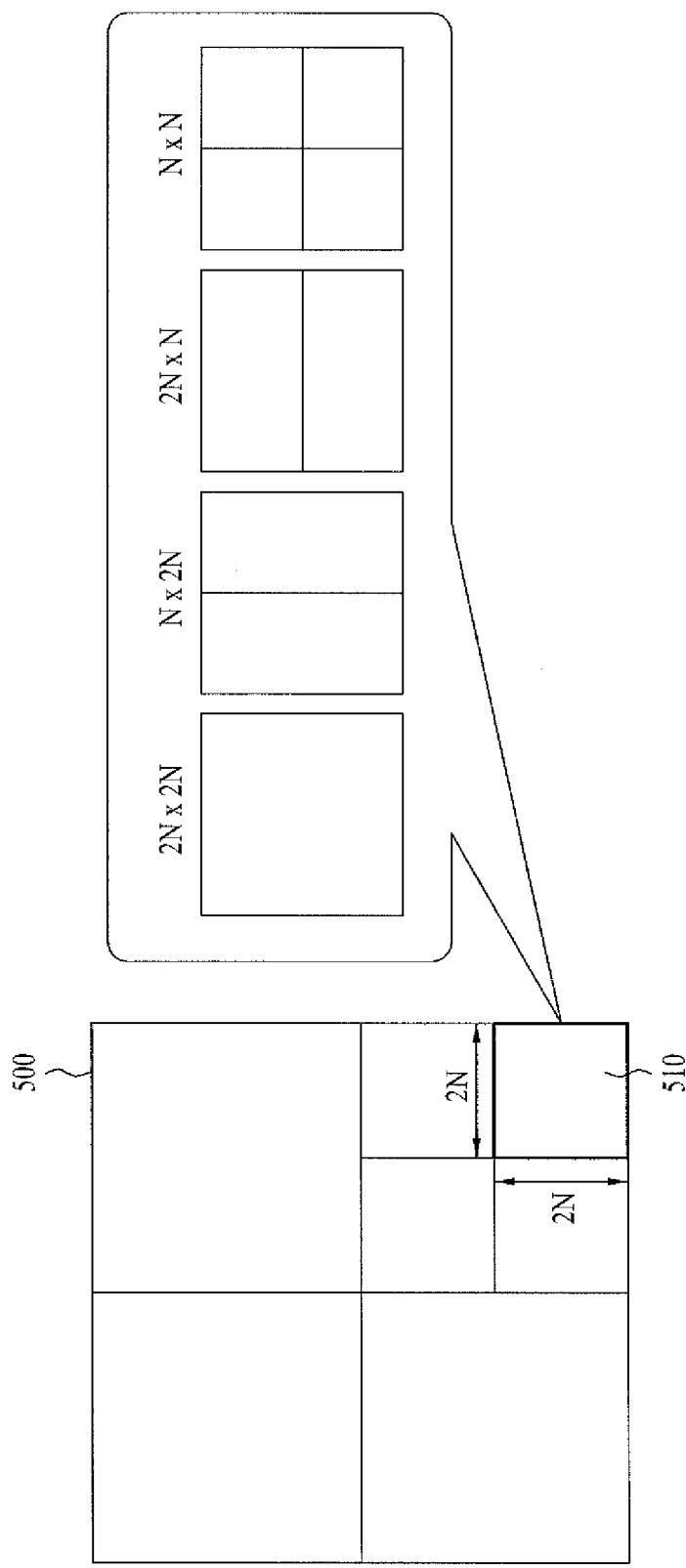
FIG. 5 is a diagram showing partition forms of a 2N×2N prediction block.

According to the embodiment of the present invention, the size and shape of the prediction block may be varied. FIG. 5 shows the case in which a minimum coding unit having a size of 2N×2N, that is, a prediction block, of an image is partitioned into blocks using various methods. As described above, a maximum-size coding unit 500 may be partitioned into several coding units and the minimum coding unit 510 becomes a basic unit of prediction. Referring to FIG. 5, one prediction block may not be partitioned or may be partitioned into four square sub-prediction blocks each having a size of N×N or rectangular sub-prediction blocks having a size of N×2N or 2N×N. The decoder may receive information about various prediction block partition shapes and partition a prediction block. In particular, a prediction block having a rectangular shape may be generated by vertically or horizontally merging sub-prediction blocks having a size of N×N and flag information indicating whether merging has been performed may be used. In the present invention, a method of deriving an intra prediction mode of a current prediction block is used by taking various prediction block shapes into consideration.

According to an embodiment of the present invention, if a prediction block (or a sub-prediction block) has a size of 2N×2N or N×N, that is, a square shape, a prediction mode may be derived as follows. If the left neighboring block 420 is not available and the upper neighboring block 430 is not available or is coded in an inter prediction mode, a DC prediction mode is derived as the MPM of the current block. If the left neighboring block 420 is coded in an inter prediction mode and the upper neighboring block 430 is not available or is coded in an inter prediction mode, a DC prediction mode is derived as the MPM of the current block. If any one of the left neighboring block 420 or the upper neighboring block 430 is coded in an intra prediction mode and the other is not available or is coded in an inter prediction mode, the intra prediction mode of the neighboring block coded in the intra prediction mode is derived as the MPM of the current block. That is, if the left neighboring block 420 is not available or is coded in an inter prediction mode and the upper neighboring block 430 is coded in an intra prediction mode, the intra prediction mode of the upper neighboring block 430 may be used as the MPM of the current block. In other cases, as described above, a prediction mode, to which the smaller number is allocated, between the prediction modes of the two neighboring blocks is set as the MPM of the current block.

If the size of the current prediction block (or the sub-prediction block) is 2N×N, the MPM of the current prediction block may be derived as follows. If the left neighboring block 420 is not available and the upper neighboring block 430 is not available or is coded in an inter prediction mode, a DC prediction mode is derived as the MPM of the current block. If the left neighboring block 420 is coded in an inter prediction mode and the upper neighboring block 430 is not available or is coded in an inter prediction mode, a DC prediction mode is derived as the MPM of the current block. If any one of the left neighboring block 420 or the upper neighboring block 430 is coded in an intra prediction mode and the other is not available or is coded in an inter prediction mode, the intra prediction mode of the neighboring block coded in the intra prediction mode is derived as the MPM of the current block. That is, if the left neighboring block 420 is not available or is coded in an inter prediction mode and the upper neighboring block 430 is coded in an intra prediction mode, the intra prediction mode of the upper neighboring block 430 may be used as the MPM of the current block. In other cases, as described above, the prediction mode of the upper neighboring block 430 is derived as the MPM of the current block.

If the size of the current prediction block (or the sub-prediction block) is N×2N, the MPM of the current prediction block may be derived as follows. If the left neighboring block 420 is not available and the upper neighboring block 430 is not available or is coded in an inter prediction mode, a DC prediction mode is derived as the MPM of the current block. If the left neighboring block 420 is coded in an inter prediction mode and the upper neighboring block 430 is not available or is coded in an inter prediction mode, a DC prediction mode is derived as the MPM of the current block. If any one of the left neighboring block 420 or the upper neighboring block 430 is coded in an intra prediction mode and the other is not available or is coded in an inter prediction mode, the intra prediction mode of the neighboring block coded in the intra prediction mode is derived as the MPM of the current block. That is, if the left neighboring block 420 is not available or is coded in an inter prediction mode and the upper neighboring block 430 is coded in an intra prediction mode, the intra prediction mode of the upper neighboring block 430 may be used as the MPM of the current block. In other cases, as described above, the prediction mode of the left neighboring block 420 is derived as the MPM of the current block.

As described above, if the prediction mode of the current block is predicted as a most probable prediction mode, information indicating whether the MPM which is a predictor of the prediction mode of the current block is equal to a prediction direction of actual prediction may be transmitted. If the prediction directions are different from each other, the information indicates that the predicted direction is different from the prediction direction of actual prediction and information indicating which prediction mode except for the prediction direction is used for prediction coding may be transmitted. If the prediction directions are the same, since information about the prediction mode need not to be transmitted, it is possible to increase compression efficiency.

Figure 6:
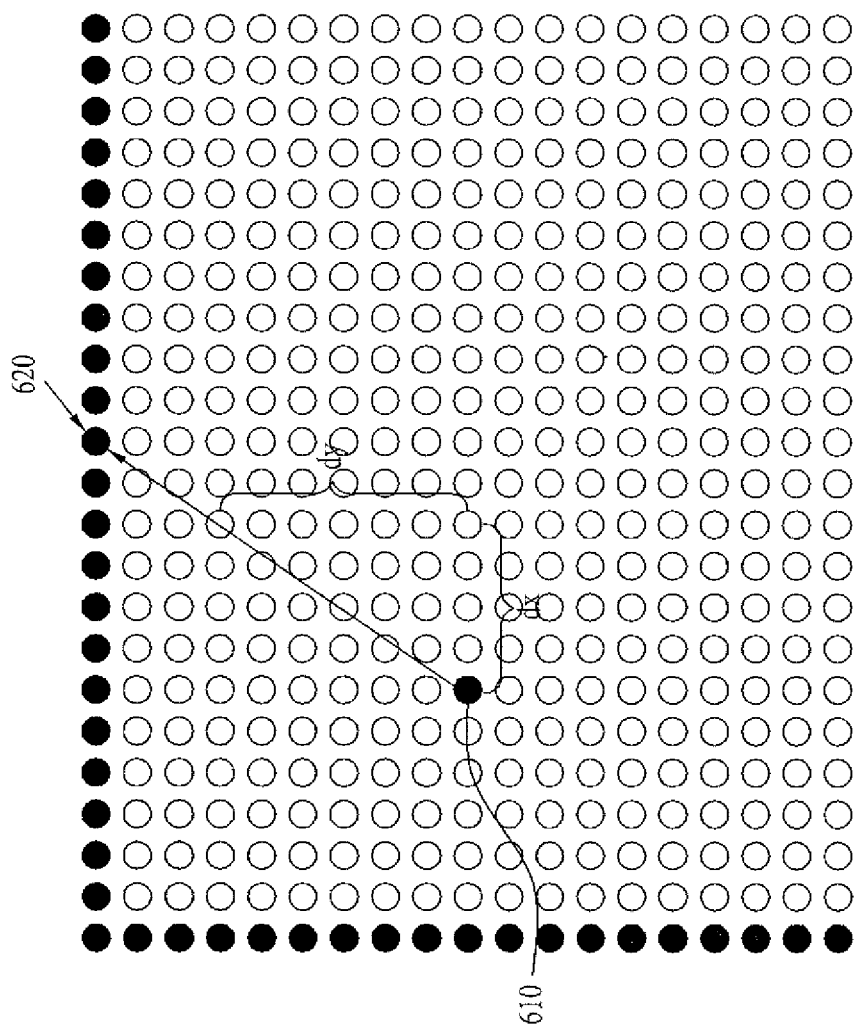
FIG. 6 is a diagram showing an arbitrary prediction direction in an intra prediction mode.

FIG. 6 shows an arbitrary prediction direction in an intra prediction mode. The arbitrary prediction direction may be represented by a slope between a current pixel 610 and a reference pixel 620 used for prediction. The size of the prediction block, which is a unit for performing prediction in one image, may be varied (e.g., 4×4, 8×8, . . . , 64×64) and the kind of the prediction direction may be more various as the size of the prediction block is larger.

According to an embodiment of the present invention, fixed prediction numbers are not allocated but prediction numbers are allocated according to prediction direction occurrence frequency, thereby increasing encoding efficiency. For example, if the prediction mode of the current block is not MPM, the prediction mode of the current block has a prediction mode having a smaller value, has directivity similar to the predicted prediction mode or may be a neighboring prediction mode which is not selected for deriving the MPM.

Figure 7:
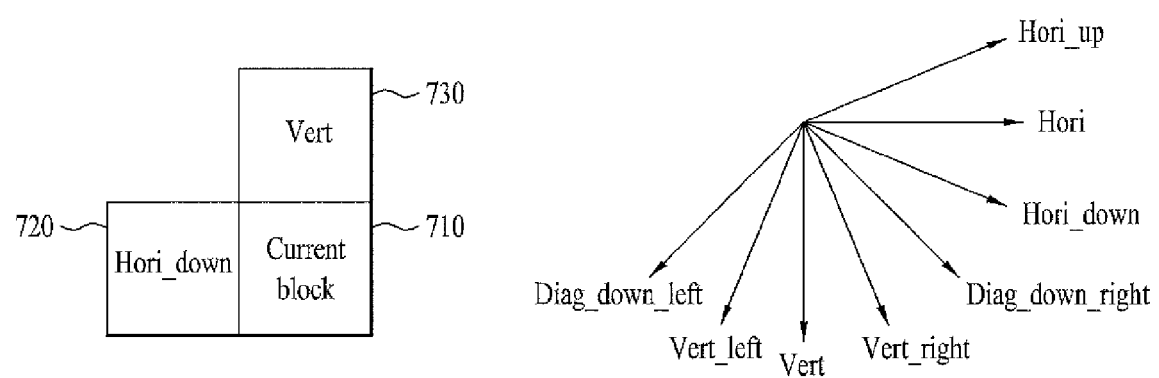

Referring to FIG. 7, for example, an upper neighboring block 730 of a current block 710 is coded in a Vert mode and a left neighboring block 720 is coded in a Hori_down mode. FIG. 8 shows several methods of allocating a prediction mode number to the current block shown in FIG. 7 according to several embodiments of the present invention.

In the current block of FIG. 7, according to the number allocation method of FIG. 3, since the Vert mode has a smaller number, the MPM value of the current block is derived as the prediction mode "Vert mode" of the upper neighboring block. Except for Vert mode which is the current MPM, numbers from 0 to 7 are sequentially allocated to the remaining prediction modes using the existing method.

According to an embodiment of the present invention, the remaining neighboring prediction mode which is not selected for prediction of the prediction mode may be regarded as a next most probable prediction mode and a smallest mode number may be allocated to the remaining neighboring prediction mode. That is, in the above example, the Hori_down mode of the unselected left block may become a next most probable mode of the MPM. The remaining prediction mode numbers are sequentially allocated using the existing method. Proposed Method 1 of FIG. 8 shows prediction numbers which are newly allocated using such a method.

According to another embodiment of the present invention, a prediction mode close to the prediction value of the prediction mode may be regarded as a most probable prediction mode and may be considered first. In the above example, Vert_left and Vert_right close to Vert may be preferentially considered. The remaining prediction mode numbers are sequentially allocated using the existing method. Proposed Method 2 of FIG. 8 shows prediction numbers which are newly allocated using such a method. Although only two adjacent directions are considered in the present embodiment, the range of the adjacent direction may be extended as necessary.

According to another embodiment of the present invention, all the above cases may be considered. That is, a low prediction number is preferentially allocated to the prediction mode of an unselected neighboring block and the mode of the adjacent direction of the predicted prediction mode. Proposed Method 3 of FIG. 8 shows prediction numbers which are newly allocated using such a method. The present invention is not limited to these embodiments and a determination as to which mode a smaller prediction number is allocated may be reversely made.

Although prediction modes of nine directions are described for convenience of description, prediction modes of more directions may be necessary according to the size of the prediction block as described above. Even when the number of prediction modes is increased, the prediction mode allocation method of the present invention is applicable.

Figure 9A:
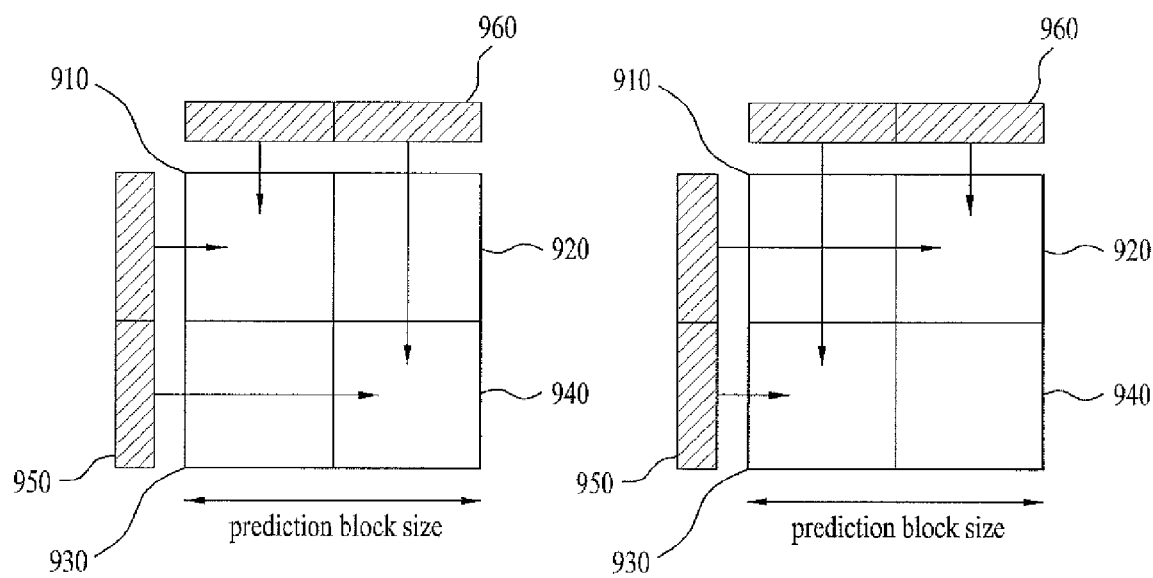
FIGS. 9(a) to 9(c) are diagrams showing use of neighboring chrominance components of a prediction block for intra prediction if one prediction block is quartered according to an embodiment of the present invention.
Figure 9B:
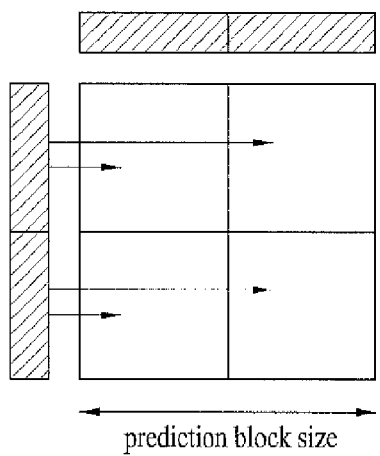
Figure 9C:
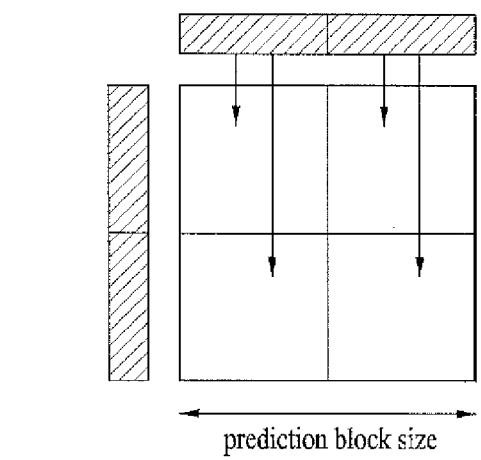

FIGS. 9(*a*) to 9(*c*) show use of chrominance components adjacent to a prediction block for intra prediction if one prediction block 900 is quartered into four sub-prediction blocks 910, 920, 930 and 940. For example, in an intra prediction mode, the chrominance components of the partitioned sub-prediction blocks are predicted using left and upper outer areas 950 and 960 of the decoded block. Within one prediction block, when the position of the left upper side of the sub-prediction block is x0, y0 and a prediction value of a current pixel (x, y) is predc[x, y] and a reference sample is p[x, y], the pixel prediction value according to each prediction mode may be derived as follows. For convenience of description, the size of each sub-prediction block is 4×4.

FIG. 9(*a*) shows which outer area is used to predict each sub-prediction block in a DC prediction mode. In the DC mode, as described above, an average value is obtained using available pixels of the outer area of the prediction block 900 and is used as a prediction value.

If x0=0, y0=0 or x0>0, y0>0, that is, in case of a left-upper sub-prediction block 910 or a right-lower sub-prediction block 940, the prediction value of the current block is as follows.

If all reference samples are available, the prediction value of the current block may be expressed by an average value of the left and upper outer areas 950 and 960

$$\text{pred}_c = [x + x0, y + y0] = \left( \sum_{x'=0}^{3} p[x' + x0, -1] + \sum_{y'=0}^{3} p[-1, y' + y0] + 4 \right) \gg 3.$$

If the upper block is not available, the prediction value of the current block may be expressed by the average value of the left outer area 950

$$\text{pred}_c = [x + x0, y + y0] = \left( \sum_{y'=0}^{3} p[-1, y' + y0] + 2 \right) \gg 2.$$

If the left block is not available, the prediction value of the current block may be expressed by the average value of the upper outer area 960

$$\text{pred}_c = [x + x0, y + y0] = \left( \sum_{x'=0}^{3} p[x' + x0, -1] + 2 \right) \gg 2$$

The prediction value of the current block may be expressed as the above.

In other cases, that is, if there is no available reference pixel, $$pred_c=[x+x0,y+y0]=1<<(BitDepth_c-1)$$

the prediction value of the current block may be expressed as the above. BitDepth$_c$ indicates the bit depth of a current block.

If x0>0, y0=0, that is, in case of the right upper sub-prediction block 920, the prediction value of the current block is expressed by the following equation:

If the upper block is available, $$pred_c = [x + xO, y + yO] = \left( \sum_{x'=0}^{3} p[x' + xO, -1] + 2 \right) \gg 2.$$

If the left block is available, $$pred_c = [x + xO, y + yO] = \left( \sum_{y'=0}^{3} p[-1, y' + yO] + 2 \right) \gg 2.$$

In other cases, $$pred_c=[x+x0,y+y0]=1<<(BitDepth_c-1)$$

If the size of the sub-prediction block is 4×4 and x0=0, y0>0, that is, in case of left-lower sub-prediction block 940, the prediction value of the current block is expressed by the following equation:

If the left block is available, $$pred_c = [x + xO, y + yO] = \left( \sum_{y'=0}^{3} p[-1, y' + yO] + 2 \right) \gg 2.$$

If the upper block is available, $$pred_c = [x + xO, y + yO] = \left( \sum_{x'=0}^{3} p[x' + xO, -1] + 2 \right) \gg 2.$$

In other cases, $$pred_c=[x+x0,y+y0]=1<<(BitDepth_c-1)$$

FIGS. 9(*a*) and 9(*b*) show areas used in each sub-prediction block in a horizontal prediction mode and a vertical prediction mode, respectively. These are expressed by the following equations.

$$pred_c[x,y]=p[-1,y]$$

$$pred_c[x,y]=p[x,-1]$$

Equations of a plane mode are as follows.

$$pred_c[x, y] = Clip1_c((a + b_S(x - 3) + c_S(y - 3) + 16) \gg 5)$$

$$a = 16_S(p[-1, heightC - 1] + p[widthC - 1, -1])$$

$$b = (34_S H) + 32) \gg 6$$

$$c = (34_S V) + 32) \gg 6$$

$$H = \sum_{x'=0}^{3} (x'+1)s(p[4+x', -1] - p[2-x', -1])$$

$$V = \sum_{y'=0}^{3} (y'+1)sp([-1, 4+y'] - p[-1, 2-y'])$$

In another embodiment of the present invention, each sub-prediction block may not use neighboring pixels of the prediction block but may use neighboring pixels of each sub-prediction block as a reference pixel. If restoration is not performed in prediction block units but is sequentially performed in sub-prediction block units, information about other sub-prediction blocks may be used when restoring a specific sub-prediction block. FIG. 10 shows an area used by each sub-prediction block for intra prediction if one prediction block is quartered according to an embodiment of the present invention. Although the sub-prediction blocks generally use the same prediction mode, different prediction modes may be used in some cases.

The following equations are obtained depending on whether the reference sample is available.

In a DC prediction mode, if all reference samples are available, $$pred_c = [x + xO, y + yO] =$$

$$\left( \sum_{x'=0}^{3} p[x' + xO, xO - 1] + \sum_{y'=0}^{3} p[yO - 1, y' + yO] + 4 \right) \gg 3.$$

If the upper block is not available, $$pred_c = [x + xO, y + yO] = \left( \sum_{y'=0}^{3} p[xO - 1, y' + yO] + 2 \right) \gg 2.$$

If the left block is not available, $$pred_c = [x + xO, y + yO] = \left( \sum_{x'=0}^{3} p[x' + xO, yO - 1] + 2 \right) \gg 2.$$

In other cases, $$pred_c=[x+x0,y+y0]=1<<(BitDepth_c-1)$$

may be expressed.

Meanwhile, in case of a horizontal prediction mode, $$pred_c[x+x0,y+y0]=p[x0-1,y+y0]$$

In case of a vertical prediction mode, $$pred_c[x+x0,y+y0]=p[x+x0,y0-1]$$

In case of a plane prediction mode, $$pred_c[x + xO, y + yO] =$$

$$Clip1_c((a + b_S(x + xO - 3) + c_S(y + yO - 3) + 16) \gg 5)$$

$$a = 16_S(p[xO - 1, yO + subHeightC - 1] +$$

$$p[xO + subWidthC - 1, yO - 1])$$

$$b = (34_S H) + 32) \gg 6$$

$$c = ((34_S V) + 32) \gg 6$$

$$H = \sum_{x'=0}^{3} (x'1 + 1)s(p[4 + x', yO - 1] - p[2 - x', yO - 1])$$

$$V = \sum_{y'=0}^{3} (y' + 1)sp([xO - 1, 4 + y'] - p[xO - 1, 2 - y'])$$

Here, subHeightC and subWidthC indicate the height and width of the sub-prediction unit, respectively.

Meanwhile, a chrominance component may be calculated using a luminance component. More specifically, the equation of the chrominance component according to a linear relationship with the luminance component may be expressed by the following equation when the luminance component and the chrominance component are respectively L(x, y) and C(x, y).

$$C'(x,y) = \alpha L(x,y) + \beta$$

At this time, coefficients are defined as follows.

$$\alpha = R\frac{(L, C)}{R(L, L)}$$

$$\beta = \operatorname{mean}(C) - \alpha L$$

However, since the decoder cannot obtain the original chrominance component or luminance component, a prediction value may be approximated by the following equation.

$$\hat{C}'(x, y) = \alpha L'(x, y) + \beta$$

$$\alpha = R\frac{(L', C')}{R(L', L')}$$

$$\beta = \operatorname{mean}(C') - \alpha L'$$

L'(x, y) and C'(x, y) indicate the restored luminance component and chrominance component of neighboring blocks, respectively.

According to the embodiment of the present invention, a method of predicting a chrominance component using a luminance component may be added as a new intra prediction mode of the chrominance component. In addition, flag information indicating whether such a prediction mode is used may be transmitted to the decoder. FIG. 11 shows an example of the syntax including flag information chroma_estimation_flag indicating whether the above-described new prediction mode is used. For example, if a prediction value mode using a luminance component is used, flag information indicates 1. Otherwise (in case of chroma_estimation_flag=0), information intra_chroma_pred_mode indicating which prediction mode is used is transmitted.

Figure 12:
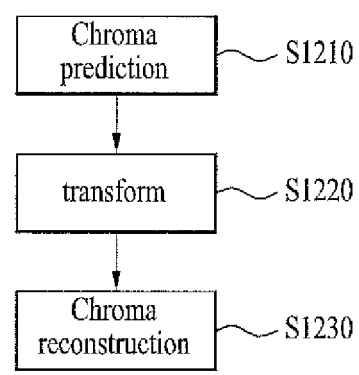
FIG. 12 is a flowchart illustrating a process of restoring a chrominance component.

FIG. 12 shows a process of restoring a chrominance component. As described above, a current block is predicted using restored pixels (S1210), is transformed (S1220), and is restored (S1230). Such a process may be performed with respect to the prediction block or in sub-prediction block units as described above. Although the chrominance component is described in FIG. 12, the luminance component may be restored in sub-prediction block units to be used for other sub-prediction blocks.

In the inter predictor 254, a method of estimating motion from a previously encoded image (or frame) and predicting a current block is used. This prediction method is referred to as inter prediction. For inter prediction, there is a need for a process of deriving information about a reference image and a motion vector indicating a reference block.

In general, a motion vector of any block has correlation with a motion vector of a neighboring block. Accordingly, a motion vector of a current block is predicted from a neighboring block and only a difference vector thereof is coded, thereby reducing the amount of bits to be coded and increasing compression efficiency. In order to obtain a motion vector prediction value, for example, a median or average value of motion vectors of neighboring blocks may be used.

However, if the neighboring block is coded in intra prediction mode, since the intra prediction mode does not include motion information, the motion vector of the intra block may be regarded as a specific value (e.g., 0) and may be generally used to predict the motion information of the current block. Hereinafter, the block coded in the intra prediction mode is referred to as an intra block and the block coded in the inter prediction mode is referred to as an inter block.

A determination as to which block size is used or which prediction mode is used may be most efficiently made through rate-distortion optimization. In general, since correlation with a previous image (or frame) is high, inter prediction is selected rather than intra prediction.

In general, intra prediction is used if inter prediction cannot be performed, for example, in case of an intra image, or if correlation between images is low and thus inter prediction performance is deteriorated. If an incorrect motion vector prediction value mvp is obtained, a motion vector difference mvd to be transmitted is too large and rate-distortion cost is increased or if a residual value is increased due to large change between two pictures and thus rate-distortion cost is increased, the intra prediction mode may be selected instead of the inter prediction mode. In addition, even in case of texture in which intra prediction may be performed, intra prediction is more advantageous than inter prediction. Accordingly, it is possible to predict a motion vector of an intra block by taking such causes into consideration.

Figure 13:
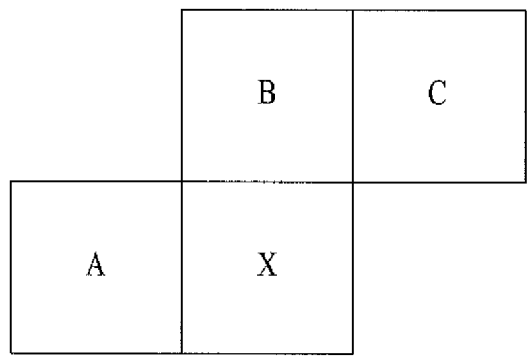
FIG. 13 is a diagram showing neighboring blocks used to predict a motion vector of an intra block.

FIG. 13 shows neighboring blocks used to predict the motion vector of an intra block X. In general, neighboring blocks A, B and C located at the left side, upper side, and right-upper side of the intra block may be used.

If a residual value is increased due to large change between two pictures, it is possible to acquire a motion vector prediction value of the intra block using motion vector values of neighboring blocks using a general method. Referring to FIG. 13, for example, the motion vector prediction value mvx of X may be obtained by a median of the motion vectors mvA, mvb and mvC of the neighboring blocks A, B and C. At this time, all the blocks A, B and C are inter blocks (for example, all the reference image indexes refA, refB and refC of A, B and C are not −1). A smallest value among the reference image indexes of A, B and C may be selected as the index of the reference image.

mvX=median(mvA, mvB, mvC)
reference index=min (refA, min(refB, refC))

As another example, if an incorrect motion vector prediction value mvp is derived, a similar motion vector is not present in the periphery of the block X. Accordingly, the motion vector of a corresponding prediction block in a reference picture may be used as a motion vector of the intra block. If the corresponding block is an intra block, a specific value (e.g., 0) may be used.

In another embodiment of the present invention, information indicating which value is used as a motion vector prediction value may be transmitted. For example, this information may represent which of the motion vectors of the neighboring blocks A, B and C or the medians mvA, mvB and mvC thereof is used as the motion vector prediction value.

If the intra prediction mode is selected because intra prediction efficiency is better than inter prediction efficiency, a method of finding a motion vector of an intra block at a decoder may be used.

Figure 14:
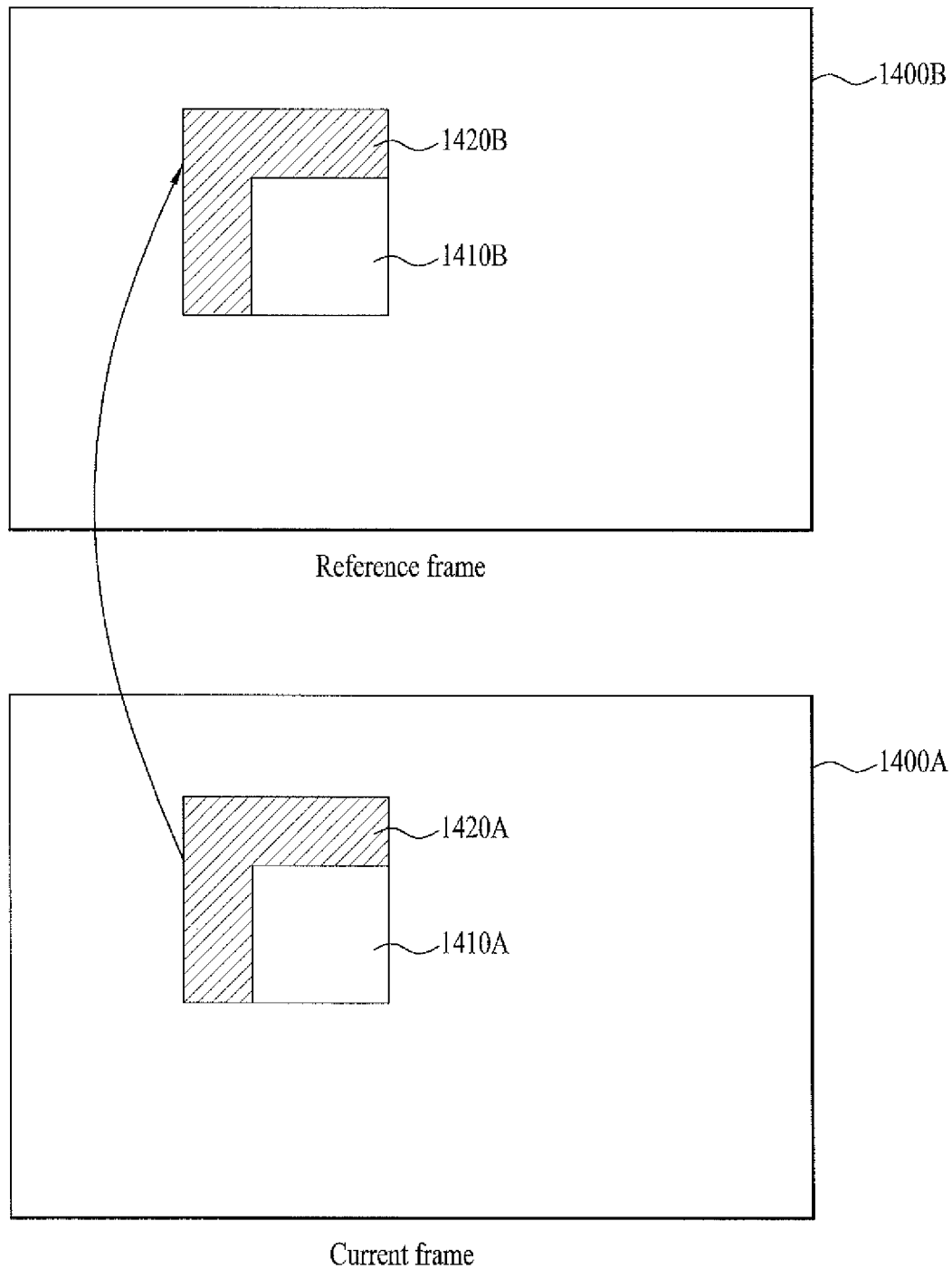
FIG. 14 is a diagram illustrating a method of utilizing a template matching method in order to find a motion vector of an intra block according to an embodiment of the present invention.

FIG. 14 shows a method of using a template matching method in order to find a motion vector of an intra block according to an embodiment of the present invention. FIG. 14 shows a current frame 1400A including a current block 1410A and a reference frame 1400B. A target area is the current block 1410A to be predicted using template matching. A template refers to an area to be found in the reference frame 1400B and an restored area is used as the template. In FIG. 14, in a coding process of the current frame 1400A, the left-upper side of the current block 1410A is an restored area and a right-lower side is an area before restoration. Accordingly, the template area 1420A may be composed of pixels located at a constant interval to contact the left and upper edge of the target area. An area 1420B similar to the template area 1420A of the current frame is found in the reference frame 1400B. The motion vector of the area 1410B corresponding to the target block on the periphery of the template similar area 2420B in the reference frame may be acquired and used as the motion vector prediction value of the target block 1410A. Although the template area is composed of a constant pixel area contacting the left and upper edge in the present embodiment, an area composed of an already restored area may be used as the template.

Meanwhile, the chrominance component may be derived using the luminance component without inter prediction as described above as shown in the following equation.

$$C'(x, y) = \alpha L'(x, y) + \beta$$
$$\alpha = R\frac{(L', C')}{R(L', L')}$$
$$\beta = \text{mean}(C') - \alpha L'$$

Accordingly, in an embodiment of the present invention, prediction using a luminance component may be added as one of an inter prediction mode. Flag information indicating whether such a prediction mode is used may be transmitted to the decoder. FIG. 15 shows an example of the syntax including such flag information chroma_estimation_flag. For example, if an approximate value mode using a luminance component is used, the flag information is 1. A chrominance component may be predicted using the luminance value according to the flag information or motion compensation using a motion vector may be performed using the existing method.

In another embodiment of the present invention, the chrominance component may be predicted using an estimation value using a luminance signal and an average of a prediction value using motion compensation.

More specifically, an estimation value C1'(x, y) using a luminance signal and C2'(x, y) using motion compensation may be expressed as follows.

$$C_1'(x,y) = \alpha L(x,y) + \beta$$

$$C_2'(x,y) = C'(x+mv_{cx}, y+mv_{cy})$$

Accordingly, a prediction value is obtained using these values as follows.

$$C'(x,y) = 0.5s(C_1'(x,y) + C_2'(x,y))$$

Similarly, a flag hybrid_prediction_flag indicating whether such a hybrid mode is used may be transmitted. FIG. 16 shows the syntax in this case.

The aforementioned embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The decoding/encoding method according to the present invention may be embodied as a program to be executed on a computer and may be stored in a computer-readable recording medium, and multimedia data having a data structure according to the present invention may be stored in a computer-readable recording medium. The computer-readable recording medium may be any type of recording device in which data can be stored in a computer-readable manner. Examples of the computer-readable recording medium include a ROM, a RAM, a CD-ROM, a magnetic tape, a floppy disc, optical data storage, and a carrier wave (e.g., data transmission over the Internet). A bitstream generated by the above encoding method may be stored in a computer-readable recording medium or may be transmitted over a wired/wireless communication network.

The embodiments of the present invention can be implemented by a variety of means, for example, hardware, firmware, software, or a combination thereof. In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by software, the embodiments of the procedures and functions described in the present specification can be implemented by separate software modules. Each software module may perform one or more functions and operations described in the present specification. Software code may be implemented by a software application written in an appropriate programing language. The software code may be stored in a memory and executed by a controller.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to encoding or decoding of a video signal.

The invention claimed is:

1. A method of decoding a video signal, the method comprising:
    receiving, by a decoding apparatus, the video signal;
    obtaining, by the decoding apparatus, flag information from the video signal, the flag information indicating whether an intra prediction mode of a current block is directly determined from a most probable mode;
    based on the flag information indicating that the intra prediction mode of the current block is not directly determined from the most probable mode, obtaining, by the decoding apparatus, intra prediction mode information of the current block from the video signal;
    obtaining, by the decoding apparatus, a predicted sample of the current block based on the obtained intra prediction mode information; and
    reconstructing, by the decoding apparatus, a sample of the current block based on the obtained predicted sample, wherein obtaining the predicted sample of the current block includes:

reallocating values of candidate intra prediction modes such that a candidate intra prediction mode corresponding to an intra prediction mode of a first neighboring block of the current block has a value of 0 and two candidate intra prediction modes having most similar prediction directions with an intra prediction mode of a second neighboring block of the current block have values of 1 and 2 respectively, wherein the intra prediction mode of the first neighboring block does not correspond to the most probable mode and the intra prediction mode of the second neighboring block corresponds to the most probable mode, selecting, from among the reallocated values of the candidate intra prediction modes, a candidate intra prediction mode corresponding to a value of the obtained intra prediction mode information, and predicting a sample of the current block based on the selected candidate intra prediction mode.

2. The method of claim 1, wherein the first neighboring block is one of an upper neighboring block or a left neighboring block of the current block, and the second neighboring block is the other of the upper neighboring block or the left neighboring block of the current block.

3. The method of claim 1, wherein the values and prediction directions of the candidate intra prediction modes are pre-defined according to the following table:

| Value | Candidate intra prediction mode |
|---|---|
| 0 | Vertical |
| 1 | Horizontal |
| 2 | DC |
| 3 | Diagonal Down Left |
| 4 | Diagonal Down Right |
| 5 | Vertical Right |
| 6 | Horizontal Down |
| 7 | Vertical Left |
| 8 | Horizontal Up. |

4. The method of claim 3, wherein the most probable mode is an intra prediction mode with a smaller value of intra prediction mode among the intra prediction mode of the first neighboring block and the intra prediction mode of the second neighboring block.

5. The method of claim 3, wherein reallocating values of candidate intra prediction modes comprises:

based on the intra prediction mode of the first neighboring block being a Horizontal Down mode and the intra prediction mode of the second neighboring block being a Vertical mode, reallocating the values and prediction directions of the candidate intra prediction modes in accordance with the following table:

| Value | Candidate intra prediction mode |
|---|---|
| 0 | Horizontal Down |
| 1 | Vertical Right |
| 2 | Vertical Left |
| 3 | Horizontal |
| 4 | Diagonal Down Right |
| 5 | DC |
| 6 | Diagonal Down Left |
| 7 | Horizontal Up. |

6. An apparatus configured to decode a video signal, the apparatus comprising:

a video decoding processor configured to:

receive the video signal;

obtain flag information from the video signal, the flag information indicating whether an intra prediction mode of a current block is directly determined from a most probable mode;

based on the flag information indicating that the intra prediction mode of the current block is not directly determined from the most probable mode, obtain intra prediction mode information of the current prediction block from the video signal;

obtain a predicted sample of the current block based on the obtained intra prediction mode information;

reconstruct a sample of the current block based on the obtained predicted sample, wherein obtaining the predicted sample of the current block includes:

reallocating values of candidate intra prediction modes such that a candidate intra prediction mode corresponding to an intra prediction mode of a first neighboring block of the current block has a value of 0 and two candidate intra prediction modes having most similar prediction directions with an intra prediction mode of a second neighboring block of the current block have values of 1 and 2 respectively, wherein the intra prediction mode of the first neighboring block does not correspond to the most probable mode and the intra prediction mode of the second neighboring block corresponds to the most probable mode, selecting a candidate intra prediction mode corresponding to a value of the obtained intra prediction mode information from among the reallocated values of the candidate intra prediction modes, and predicting a sample of the current block based on the selected candidate intra prediction mode.

7. The apparatus of claim 6, wherein the first neighboring block is one of an upper neighboring block or a left neighboring block of the current block, and the second neighboring block is the other of the upper neighboring block or the left neighboring block of the current block.

8. The apparatus of claim 6, wherein the values and prediction directions of the candidate intra prediction modes are pre-defined according to the following table:

| Value | Candidate intra prediction mode |
|---|---|
| 0 | Vertical |
| 1 | Horizontal |
| 2 | DC |
| 3 | Diagonal Down Left |
| 4 | Diagonal Down Right |
| 5 | Vertical Right |
| 6 | Horizontal Down |
| 7 | Vertical Left |
| 8 | Horizontal Up. |

9. The apparatus of claim 8, wherein the most probable mode is an intra prediction mode with a smaller value of intra prediction mode among the intra prediction mode of the first neighboring block and the intra prediction mode of the second neighboring block.

10. The apparatus of claim 8, wherein reallocating values of candidate intra prediction modes comprises:

based on the intra prediction mode of the first neighboring block being a Horizontal Down mode and the intra prediction mode of the second neighboring block being a Vertical mode, reallocating the values and prediction directions of the candidate intra prediction modes in accordance with the following table:

| Value | Candidate intra prediction mode |
|---|---|
| 0 | Horizontal Down |
| 1 | Vertical Right |
| 2 | Vertical Left |
| 3 | Horizontal |
| 4 | Diagonal Down Right |
| 5 | DC |
| 6 | Diagonal Down Left |
| 7 | Horizontal Up. |

* * * * *